United States Patent [19]

Irwin

[11] Patent Number: 5,004,834
[45] Date of Patent: Apr. 2, 1991

[54] PREPARATION OF POLYAMIDES FROM UNSTABLE DIAMINES

[75] Inventor: Robert S. Irwin, Wilmington, Del.

[73] Assignee: E. I. Du Pont de Nemours and Company, Wilmington, Del.

[21] Appl. No.: 505,342

[22] Filed: Apr. 5, 1990

[51] Int. Cl.$^5$ .............................................. C07C 231/02
[52] U.S. Cl. ..................................... 564/142; 564/139
[58] Field of Search ........................ 564/142, 139, 140

[56] References Cited

U.S. PATENT DOCUMENTS

| | | | |
|---|---|---|---|
| 1,857,555 | 5/1932 | Laska et al. | 564/142 |
| 1,972,142 | 9/1934 | Goldstein | 564/139 |
| 2,694,072 | 11/1954 | von Glahn et al. | 564/140 |
| 3,094,551 | 6/1963 | Sauers et al. | 526/75 |
| 3,240,760 | 3/1966 | Preston et al. | 528/315 |
| 3,839,294 | 10/1974 | Manos | 564/82 |
| 3,859,252 | 1/1975 | Cho | 564/430 |
| 4,025,494 | 5/1977 | Morgan | 260/78 |

FOREIGN PATENT DOCUMENTS 0610182 12/1960 Canada ................................ 564/142

OTHER PUBLICATIONS

Wolf, G., et al., "Aromatic Polyamides with Trifluoromethyl Groups", CA, vol. 84, 32477m (1976).
Horyna, J., "Preparation of Heat-Stable Aromatic Polyamides", CA, vol. 112, 21446w (1/22/90).

Primary Examiner—Glennon H. Hollrah
Assistant Examiner—Susan P. Treanor

[57] ABSTRACT

A method is described for preparation of polyamides using unstable diamines.

4 Claims, No Drawings

PREPARATION OF POLYAMIDES FROM UNSTABLE DIAMINES

BACKGROUND OF THE INVENTION

Chloro-p-phenylene diamine and related diamines are unstable to storage The compounds that form on storage of chloro-p-phenylene diamine, even in sealed containers, are discolored and without repurification, the stored product is likely to provide polyamides of reduced molecular weight on polymerization with, for example, terephthaloyl chloride. As is well known, low molecular weight polymer commonly results in fiber with poorer tensile properties.

Chloro-p-phenylene diamine is also unstable at high temperatures and this creates particular difficulties in its purification. By contrast, the hydrochloride salts of chloro-p-phenylene diamine and its analogs have much superior stability to the free diamine.

SUMMARY OF THE INVENTION

This invention provides a process for preparing high molecular weight polyamides comprising forming a slurry of the dihydrochloride of

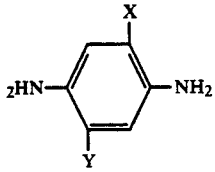

where X is Cl, Br or lower alkyl, and Y is Cl, Br, lower alkyl or hydrogen in a solvent for the diamine, reacting the dihydrochloride with a tertiary amine in an amount at least equivalent to the HCl of the dihyrdochloride to form free diamine in solution and treating the solution with an aromatic diacid chloride to form the polyamide.

DETAILED DESCRIPTION OF THE INVENTION

The present process is particularly useful for polymerization involving the reaction of monosubstituted and disubstituted p-phenylene diamines with aromatic diacid halides. Examples of such diamines are monochloro-p-phenylene diamine, methyl-p-phenylene diamine, 5-chloro-2-methyl-p-phenylene diamine, 2,5-dichloro-p-phenylene diamine, etc. Thus, chloro, bromo and lower alkyl (1-6 C atoms) substituents are contemplated.

As a first step, a slurry of the dihydrochloride of the diamine is formed in a liquid that is a solvent for the diamine but in which the dihydrochloride is essentially insoluble. Preparation of the diamine dihydrochloride is well-known to those skilled in the art. A suitable solvent is N-methyl pyrrolidone (NMP) with calcium chloride. Other amide-metal salt solvent systems may be used for the purpose of serving as solvent for the diamine and as carrier in the dihydrochloride slurry. The content of dihydrochloride in the slurry is not critical. Amounts of from 2 to 15% by wt. are suitable.

The slurry is treated with a tertiary amine in an amount at least equivalent to the HCl of the dihydrochloride. This frees the diamine which then dissolves in the solvent. The tertiary amine hydrochloride which forms, may or may not dissolve, depending on the particular tertiary amine and the solvent employed. Tertiary amines that can be used in the process include diethylaniline, tributylamine and methylmorpholine.

The solution of free diamine is then treated with an aromatic diacid halide to form the polyamide. Terephthaloyl halide is used in the example below; however, other diacid halides can be conveniently employed.

MEASUREMENTS

Inherent Viscosity is measured as follows:

$$I.V. = \frac{\ln(R.V.)}{C}$$

where R.V. is the relative viscosity and C is the concentration in grams of polymer per deciliter of solvent, typically 0.5g in 100 ml. (Thus, the units for inherent viscosity are dl/g.) The relative viscosity is determined by dividing the flow time of the dilute solution in a capillary viscometer by the flow time for the pure solvent. The flow times are determined at 30° C.

Example 1 below is presented to illustrate the invention and is not to be construed as limiting.

EXAMPLE 1

In a resin kettle, pre-dried flaming out with a propane torch, fitted with a cage-shaped stirrer and under a slow current of dry nitrogen, 6.05 g anhydrous $CaCl_2$ (0.055 mole) was dissolved in 99 ml. anhydrous NMP (102 g); heating to 80° C. was required. To this was added 11.853 g (0.055 mole) of the dihydrochloride of chloro-p-phenylene diamine (ClPPD) to form a slurry at room temperature. This was treated with 16.39 g anhydrous diethylaniline (0.110 mole; pre-dried by distillation over $P_2O_5$) to give a solution containing free ClPPD and diethylaniline hydrochloride. This was cooled to 5°-10° C. and with good stirring 11.165 g terephthaloyl chloride (0.055 mole) was added quantitatively all at once. This rapidly transformed from a clear solution to a rubbery, anisotropic gel containing 10% chloro-p-phenylene terephthalamide. The gel was treated with excess cold water in a blender and the precipitated polymer filtered, washed thoroughly with water, and dried at 80° C. Inherent viscosity in 100% $H_2SO_4$ was 5.88.

The suitability of the substituted diamine dihydrochloride in the process of this invention is surprising since paraphenylenediamine dihydrochloride is not, as shown by the following experiments.

A. 11.853 g (0.055 mole) of the dihydrochloride of chloro-p-phenylenediamine was slurried with 99 ml anhydrous NMP (102 g) in a dry resin kettle fitted with a cage stirrer. With the addition, at room temperature, of 16.4 g N,N'-diethylaniline (0.11 mole), the slurry was quickly replaced by a clear, dark solution.

With addition of 11.165 g isophthaloyl chloride (0.055 mole), the solution viscosity increased significantly as poly(3-chloro-1,4-phenylene) isophthalamide was formed. The corresponding polyterephthalamide may be formed in like fashion.

B. In identical fashion to the above, 9.955 g (0.055 mole) of the dihydrochloride of p-phenylene diamine, stirred in 99 ml NMP (102 g) was treated with 16-4-g N,N'-diethylaniline (0.11 mole) at room temperature. After stirring for 24 hr, the PPD.2HCl remained substantially undissolved, thus failing to provide a quantitative conversion in situ to free diamine. In this event, polymerization with a diacid chloride was not possible.

I claim:

1. A process for preparing high molecular weight polyamides comprising forming a slurry of the dihydrochloride of

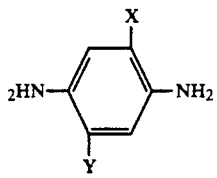

where X is Cl, Br or lower alkyl and Y is Cl, Br, lower alkyl or hydrogen in a solvent for the diamine, reacting the dihydrochloride with a tertiary amine in an amount at least equivalent to the HCl of the dihydrochloride to form free diamine in solution and treating the solution with an aromatic diacid chloride to form the polyamide.

2. A process according to claim 1 wherein X is Cl and Y is hydrogen.

3. A process according to claim 1 wherein the solvent is N-methylpyrrolidone containing $CaCl_2$.

4. A process according to claim 1 wherein the tertiary amine is diethylaniline.

* * * * *